United States Patent Office 3,530,204
Patented Sept. 22, 1970

3,530,204
PHOSPHORUS REACTION PRODUCTS
Robert C. Harrington, Jr., and James H. Bond, Kingsport, Tenn., assignors to Eastman Kodak Company, Rochester, N.Y., a corporation of New Jersey
No Drawing. Continuation-in-part of application Ser. No. 323,081, Nov. 12, 1963. This application Nov. 9, 1967, Ser. No. 681,918
Int. Cl. C07f 9/02; C09k 3/28
U.S. Cl. 260—926                8 Claims

ABSTRACT OF THE DISCLOSURE

A reaction product comprising a phosphorus compound derived by reacting a compound having the formula $P_nN_{n-1}Cl_{2n+3}$ wherein $n$ is an integer greater than 1 and a pentahalogenated phenol. The reaction product is particularly useful in imparting fire resistance properties to plastics when compounded therewith.

---

This application is a continuation-in-part of Ser. No. 323,081, filed Nov. 12, 1963, now abandoned.

This invention generally relates to novel phosphorus compounds derived by reacting a compound having the formula $P_nN_{n-1}Cl_{2n+3}$, wherein $n$ is an integer greater than 1, with a pentahalogenated phenol. These novel phosphorous compounds have utility as additives to cellulose ester compositions to impart flame resistant properties thereto.

For a complete understanding of this invention reference is made to the following detailed description.

In French Pat. 1,157,097 there is disclosed a compound having the general formula $P_nN_{n-1}Cl_{2n+3}$ wherein $n$ is an integer greater than one. Specific examples of such compounds are $P_2NCl_7$, $P_3N_2Cl_9$, $P_4N_3Cl_{11}$, $P_5N_4Cl_{13}$, $P_6N_5Cl_{15}$, $P_7N_6Cl_{17}$, $P_8N_7Cl_{19}$, $P_9N_8Cl_{21}$, $P_{10}N_9Cl_{23}$, etc.

In accordance with this invention, a novel reaction product is derived by reacting, from about 90 parts to 110 parts by weight of a compound having the formula $P_nN_{n-1}Cl_{2n+3}$, wherein $n$ is an integer greater than 1, and preferably from 2 to 10, and from about 35 parts to 45 parts by weight of a pentahalogenated phenol such, for example, as pentachlorophenol, pentabromo phenol, and pentafluorophenol. The reaction is carried out preferably in the presence of an inert diluent. The inert diluent is subsequently removed from the reaction mass by distilling it off.

The reaction is preferaby carried out at elevated temperatures of the order of from about 110° C. to 130° C. during which time the reaction mass preferably is constantly agitated. However, this temperature range is not critical since the reaction can be carried out at various temperatures with the only real limitation being the decomposition temperatures of the reactants and reaction products. A practical reaction temperature to be employed would include consideration of the above factor together with the desired reaction rate. This may be easily determined by one skilled in the art.

The reaction is accompanied by liberation of heat, and the temperature may be maintained within the desired limits specified by external cooling. Heating and constant agitation are carried out for a period of from about 2 to 6 hours when operating in a temperature range from about 110° C. to 130° C.

The reaction product can be reacted further, if desired, with ammonia, preferably in anhydrous form. Thus, for example, gaseous ammonia can be bubbled through the reaction mass to provide a novel reaction product comprised of amino groups. The amount of ammonia employed will be of the order of from about 25% to 35% by weight based on the weight of the $P_nN_{n-1}Cl_{2n+3}$ reactant.

Suitable inert diluents that can be used in this invention include tetrachloroethane, carbon tetrabromide, tribromoethane, ethylene tetrachloride, benzene, toluene, carbon tetrachloride, chlorobenzene, and mixtures of two or more.

The novel phosphorus compounds of this invention can be thoroughly admixed with organic acid esters of cellulose to provide compositions from which articles can be shaped or formed which have excellent fire or flame resistant properties. The amount of phosphorous compound employed can be varied over a relatively wide range; however, amounts of from about 1% to 10% by weight based on the weight of the ester have proved satisfactory in practice.

The novel phosphorus compounds have particular utility in the preparation of fire resistant fibers of organic acid esters of cellulose. From about 1% to 10% by weight of the phosphorus compound based on the weight of the cellulose ester is incorporated into a conventional cellulose ester spinning dope and fibers spun therefrom by conventional methods. The resulting fibers have good resistance to flames, and can be washed or dry cleaned a substantial number of times without losing to any substantial degree their flame resistant properties. In addition, the tensile characteristics and other properties such as hand, elongation, and luster of the fibers are not altered appreciably.

The following examples are illustrative of this invention. All parts are by weight unless otherwise specified.

Example I

An orange liquid is prepared in accordance with the teachings of French Pat. 1,157,097. Into a reaction vessel equipped with an agitator, a reflux column, and a thermometer are placed 417 parts of phosphorus pentachloride, 92 parts of ammonium chloride, and 150 parts of symmetrical tetrachloroethane. The resulting mixture is heated to about 90° C. to 110° C. and the mixture is constantly agitated. Heating is continued until the temperature of the reaction mass has become stable at about 147° C. A fall to about 145° C. in about ½ hour is then noted after which the temperature rises to about 155° C. with extensive liberation of gaseous hydrochloric acid. The temperature of the reaction mass gradually decreases, and when it reaches about 140° C., heating is discontinued. On cooling to room temperature a reaction product is obtained that is a clear orange liquid in which there form a few yellow crystals.

Example II

Into a reaction vessel fitted with a stirring rod, a reflux column, and a thermometer there are placed 100 parts of the reaction product of Example I and 40 parts of pentachlorophenol. Tetrachloroethane is added as an inert diluent. The resulting mixture is heated to 120° C. during which time an exothermic reaction takes place. The temperature of 120° C. is maintained for four hours during which time the mixture is stirred constantly. At the end of four hours heating is discontinued and the reaction mass is permitted to cool to room temperature. The inert diluent is removed from the reaction mass by distillation. The resulting reaction product is a crystalline material which, on analysis, is shown to have the average formula

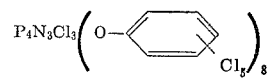

Example III

In a reaction vessel similar to that used in Example II there are placed 100 parts of the reaction product of Example I and 40 parts of pentachlorophenol. Tetrachloroethane is added as an inert diluent. The resulting mixture is heated to about 120° C. and maintained at this temperature for about four hours with constant stirring. The reaction mass is cooled to room temperature. At this point 30 parts of gaseous, anhydrous ammonia is bubbled through the reaction mass, and a white solid is produced which is separated by filtration. Ammonium chloride, one of the products of the reaction, is removed from the white solid by washing with water. The final product, on analysis, is shown to have the average formula

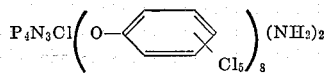

Example IV

Into a reaction vessel similar to that employed in Example II are placed 100 parts of the reaction product of Example I and 35 parts of pentabromophenol. Tetrachloroethane is added as an inert diluent. The resulting mixture is heated to about 120° C. During the heating to 120° C. an exothermic reaction takes place. The temperature of 120° C. is maintained for about 4 hours during which time the reaction mass is stirred constantly, after which the reaction mass is cooled to room temperature. A slightly tan reaction product is recovered from the reaction mass, and, on analysis, is found to have an average formula of

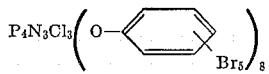

Example V

One part of the compound formed in Example II is added to 100 parts of spinning dope comprised of 29% by weight of cellulose acetate and 71% by weight of acetone solvent. Fibers are dry spun from this dope. The fibers have a denier per filament of 4 and a total denier of 150. The fibers are dried to remove acetone therefrom. A skein of this yarn is ignited with a Bunsen burner. The flame quickly dies, and there is no further propagation of burning.

Example VI

Three parts of the compound as formed in Example II is added to 100 parts of a spinning dope comprised of 29% by weight of cellulose acetate and 71% by weight of acetone solvent. A yarn of 4 denier per filament and a total denier of 150 is dry spun from this dope. The fibers are dried to remove therefrom acetone solvent. An attempt was made to ignite a skein of these fibers with a Bunsen burner. No flaming or flame propagation was observed. The fibers will not support combustion even after 10 washings or 10 drycleanings. A skein of unmodified cellulose acetate fibers was quickly and entirely consumed when placed in the flame of a Bunsen burner.

Example VII

Two parts of the reaction product of Example III is added to 100 parts of a spinning dope comprised of 29% by weight of cellulose acetate and 71% by weight of acetone solvent. Fibers of 4 denier per filament and a total denier of 150 are dry spun from the modified dope. The fibers are dried to remove the acetone solvent. Attempts were made to ignite a skein of these fibers with the flame from a Bunsen burner. The fibers would not support combustion and it was still impossible to ignite the fibers after 5 washings or 5 drycleanings.

Example VIII

Two parts of the reaction product of Example IV is added to 100 parts of a spinning solution comprised of 29% by weight of cellulose acetate and 71% by weight of acetone solvent. Fibers of 8 denier per filament and a total denier of 150 are dry spun from the resulting modified dope. The fibers are dried to remove the acetone solvent. A skein of these fibers could not be ignited with the flame from a Bunsen burner. The fibers can be subjected to 10 washings or 10 drycleanings and still cannot be ignited.

The phosphorus compounds of this invention can be incorporated into other organic acid esters of cellulose such as cellulose propionate, cellulose butyrate, cellulose acetate butyrate, cellulose acetate propionate, and cellulose triacetate, to provide compositions from which articles can be formed or shaped by known methods such as molding. The resulting articles have outstanding flame resistant properties. Many flame resistant articles can be prepared from the compositions of this invention such, for example, as film, toys, beads, cutlery handles, knobs, electrical parts, and housings for small-motored electrical appliances.

The exact constitution of the phosphorus compounds of this invention has not yet been determined. However, analysis shows that in the starting reactant of the formula $P_nN_{n-1}Cl_{2n+3}$, the major part of the chlorine atoms are substituted by

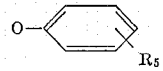

groups (R is a halogen such as chlorine, bromine, or fluorine). The formula which best illustrates these observations is

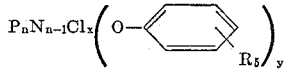

in which $x+y=2n+3$. When the above product is further reacted with ammonia the formula will be

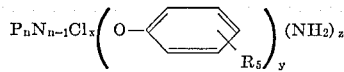

wherein $x+y+z=2n+3$.

It is to be understood that the above description and examples are illustrative of the invention and not in limitation thereof.

We claim:

1. A linear, phosphorus reaction product derived by reacting from about 90 parts to 110 parts by weight of a compound having the formula $P_nN_{n-1}Cl_{2n+3}$ wherein $n$ is an integer of from 1 to about 10 and from about 35 parts to 45 parts by weight of a pentahalogenated phenol, said reaction product having the following empirical formula

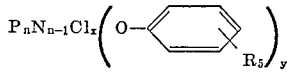

wherein R is halogen, $n$ is defined above and $x+y=2n+3$.

2. A reaction product according to claim 1 wherein $n$ is an integer from 2 to 10.

3. A reaction product according to claim 2 wherein the pentahalogenated phenol is pentachlorophenol.

4. A reaction product according to claim 2 wherein the pentahalogenated phenol is pentabromophenol.

5. A linear, phosphorus reaction product derived by reacting from about 90 parts to 110 parts by weight of a compound having the formula $P_nN_{n-1}Cl_{2n+3}$ wherein $n$ is an integer of from 1 to about 10 with from about 35 parts to 45 parts by weight of a pentahalogenated phenol and then with anhydrous ammonia in an amount equal to from about 25% to about 35% by weight based on the weight of the compound having the formula $$P_nN_{n-1}Cl_{2n+3}$$

said reaction product having the following empirical formula

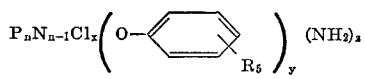

wherein R is halogen, $n$ is defined above and $x+y+z=2n+3$.

6. A reaction product according to claim 5 wherein $n$ is an integer from 2 to 10.

7. A reaction product according to claim 6 wherein said pentahalogenated phenol is pentachlorophenol.

8. A reaction product according to claim 6 wherein said pentahalogenated phenol is pentabromophenol.

References Cited
UNITED STATES PATENTS 3,206,494   9/1965   Lund et al. _____ 260—927

CHARLES B. PARKER, Primary Examiner

R. L. RAYMOND, Assistant Examiner

U.S. Cl. X.R.

252—8.1; 260—927